Aug. 31, 1943.  J. J. NEUMAN  2,328,395
APPARATUS FOR PROCESSING SUGAR AND THE LIKE
Filed March 24, 1939

INVENTOR.
Jacob J. Neuman
BY C. P. Goepel
his ATTORNEY

Patented Aug. 31, 1943

2,328,395

UNITED STATES PATENT OFFICE 2,328,395

APPARATUS FOR PROCESSING SUGARS AND THE LIKE

Jacob J. Neuman, South Salem, N. Y.

Application March 24, 1939, Serial No. 263,974

1 Claim. (Cl. 257—80)

This invention relates to new and useful improvements in apparatus for processing sugars and the like and is directed more particularly to heating and simultaneously agitating the material being processed in a treating vessel by means of a rotatable heating screw in fluid communication with a heat transferring medium and presenting a continuous heat transferring surface to the material being processed, the invention having for its primary object to support the agitating helix intermediate its ends and at the same time permit unimpeded passage through the intermediate support of the material undergoing treatment.

To this end the invention consists in the provision of a ring member secured to the apex of one of the flights of the apex intermediate the ends of the latter and a stationary channel member in the treating vessel forming a bearing for the ring member.

With the foregoing and other objects in view, the invention will be described more fully hereinafter, illustrated by way of example in the accompanying drawing and more particularly pointed out in the appended claim.

Referring to the drawing in which numerals of like character designate similar parts throughout the several views—

Figure 1:
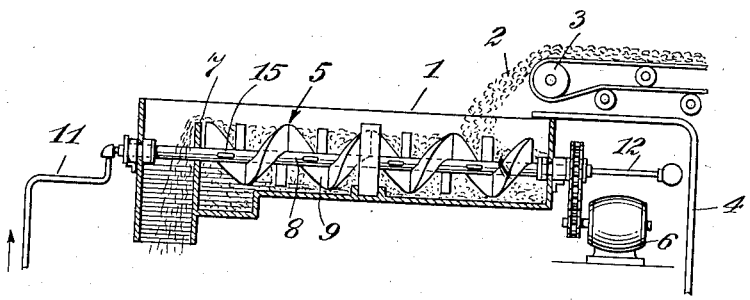
Fig. 1 is a vertical sectional view taken through material treating apparatus embodying the present invention.

In the drawing, referring more particularly to Fig. 1, the material treating apparatus comprises a trough 1 supplied with raw sugar or the like 2 by a conveyor 3 from a suitable source of supply. Water or other liquid is introduced into the trough by means of pipe 4 to form a magma of any desired consistency or density. The material in the trough is agitated by a rotatable screw conveyor or the like generally indicated by the numeral 5 and driven by any suitable means such as a motor 6 in such a manner that the material will be advanced in the trough toward the left where the same will flow over a vertical baffle or weir 7 and be delivered to the next processing unit (not shown).

Figure 3:
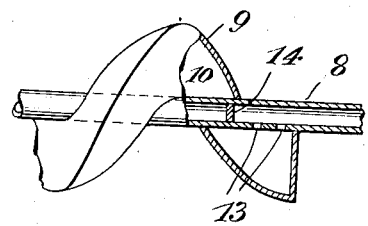
Fig. 3 is an enlarged fragmentary detail view in side elevation of the agitating helix with certain parts broken away and in section. The paddles and sectionalized feature of the helix indicated in Fig. 1, which are optional, are not shown in this figure.

The screw conveyor 5 comprises a tubular shaft 8 having welded or otherwise suitably secured thereto a hollow helical element 9 substantially V-shaped in cross-section and arranged to provide about the periphery of the shaft a continuous helical conduit 10 for a heat transferring fluid, the helical element being either sectionalized as shown in Fig. 1 with the ends of adjacent sections welded or otherwise suitably secured together, or said helical element may be formed as a single member as shown in Fig. 3. The tubular shaft 8 is rotatably supported adjacent its oppositee ends in the walls of the trough 1 and has an inlet connection 11 and an outlet connection 12 at its opposite ends, respectively, for a heat transferring fluid supplied from a suitable source (not shown). Adjacent its opposite ends, the helical conduit 10 is in communication with the interior of the shaft 8 by means of radial openings 13 provided in the shaft as clearly shown in Fig. 3 for one end of the screw conveyor. In order to insure proper flow of the heat transferring fluid through the helical conduit, a sealing plug 14 is provided adjacent the inlet end of the shaft 8 and inwardly of the radial openings 13 so that all heat transferring fluid admitted to the inlet end of the shaft passes into the conduit 10.

When treating relatively thick magmas and the like, paddles 15 may be provided on the periphery of the shaft between adjacent turns of the helical element 9 as clearly shown in Fig. 1 to increase the turbulence or agitation created by the screw conveyor.

Figure 2:
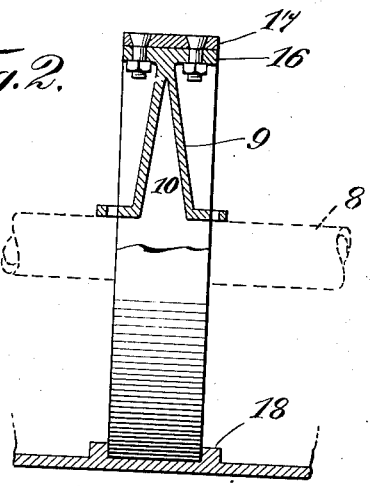
Fig. 2 is an enlarged sectional detail of a portion of the agitating helix of Fig. 1 showing the intermediate bearing support therefor.

Intermediate its ends, the helical element 9 is formed at the apex of one of the hollow flights with a flange or bracket 16 (Fig. 2) having bolted or otherwise suitably secured thereto a collar or ring 17 of a diameter slightly larger than that of the screw conveyor 5 and preferably composed of low friction material. The ring 17 cooperates with a bearing in the form of a stationary channel member 18 arranged in the trough 1 to support the screw conveyor assembly intermediate the ends of the latter and prevent eccentric displacement due to possible localized resistance of the screw flights to turning. Thus, by having the helical element 9 forming a helical conduit 10 about the shaft 8 for the flow of a heat transferring fluid, a substantially continuous heat transferring surface is provided by the screw conveyor 5 for the material undergoing treatment in the trough 1. Moreover, by having the screw conveyor assembly supported intermediate its ends by the ring and bearing arrangement disclosed, the material undergoing treatment in the trough 1 can be carried along the entire length of the conveyor without interruption or obstruction since the ring 17 permits unimpeded passage of the material therethrough.

From the foregoing it is believed that the construction and advantages of the invention may be readily understood by those skilled in the art without further description, it being borne in mind that numerous changes may be made in the details disclosed without departing from the spirit of the invention as set out in the following claim.

What is claimed is:

In material processing apparatus, in combination, a trough for receiving the material to be processeed, a tubular shaft extending longitudinally through said trough and being rotatably supported at its opposite ends, said shaft having an inlet end adapted to be connected to a source of heating fluid, the opposite end of said tubular shaft forming an outlet for the heating fluid, a hollow helical member substantially V-shaped in cross section mounted on said shaft and forming therewith a closed continuous helical conduit surrounding the periphery of said shaft and presenting in continuous heat transferring surface for the material to be processed in the trough, a plug member in said tubular shaft spaced inwardly from said inlet end, said tubular shaft having radial openings adjacent said plug member for the passage of the heating fluid from the inlet end of said shaft into one end of said helical conduit, said tubular shaft having radial openings in the outlet end thereof for the discharge of the heating fluid from the other end of said helical conduit into the outlet end of said shaft, a ring member secured to the apex of one flight section of said helical member intermediate the ends of said shaft, and a stationary channel member in said trough forming a bearing for said ring member, said ring member permitting unimpeded passage therethrough of the material conveyed by said helical member.

JACOB J. NEUMAN.